Patented Feb. 15, 1927.

1,618,150

UNITED STATES PATENT OFFICE.

LOUIS FACKLER, OF RIDGEWOOD, NEW JERSEY, ASSIGNOR TO THE STEIN-DAVIES COMPANY, OF NEW YORK, N. Y., A CORPORATION OF NEW YORK.

ADHESIVE AND METHOD OF ITS MANUFACTURE.

No Drawing.    Application filed December 15, 1921. Serial No. 522,459.

My invention relates to a substantially colorless liquid adhesive and the method of its manufacture, which liquid adhesive has many uses in the arts, as, for instance, in connection with sizing, glue and the like; although it will be understood that I do not wish to confine myself except as pointed out in some of the claims hereto appended to any particular use of the product of my improved process.

My invention enables the production of a size or adhesive which not only has the valuable property of being readily soluble in cold water, but is also substantially colorless and will neither gelatinize nor decompose on standing over relatively long periods of time.

By reason of the highly complicated character of the substances which impart color to dextrine and the lack of accurate knowledge of their composition, no indication of the possibility of bleaching dextrine has, so far as I am aware, been available. Furthermore, the fact that the manufacture of dextrine is usually carried out as a dry process has presented practical difficulties to bleaching which have heretofore not been surmounted.

I have discovered that certain oxygen carriers, under proper conditions, will yield oxygen, probably in a nascent state, to a solution containing a dextrine and that this action causes a bleaching or elimination of the color-bearing constituents of the dextrine. The chemistry of this action is highly involved and by no means settled and I therefore will not attempt to describe the chemical action which is believed to take place.

I preferably employ a dextrine of tenacious consistency when mixed, which in its natural state is quite dark. By my process, however, I am able to bleach dextrines of this type so that they will form when mixed a substantially colorless product and readily go into solution even when cold. I also produce an intermediate product, comprising a dry dextrine and a dry alkaline perborate which may be sold in a dry state and mixed when desired by the ultimate consumer.

In practising my improved process, I may start with a dextrine prepared in any suitable manner, such as many of the processes well-known to the prior art and in commercial practice; as for instance, the subjecting of starch or starch-bearing material to the action of heat, or heat and acid, or some other agent used for the purpose of breaking down the starch cell structure, many examples of which are to be found in the prior art. If the ordinary and well-known process of using heat and an acid is used, a brownish colored product is produced, which is difficultly soluble in cold water because of its tendency to "ball up", forming slowly soluble agglomerations. This condition is sometimes remedied in practice by the addition of borax to the dextrine, but in all processes with which I am familiar, whether an agent to assist solubility is used or not, the solution obtained is relatively highly colored and is consequently unusable for many purposes in the art; as for instance, white paper sizing; the gluing of light-colored or colorless papers; etc.

For the production of certain products, as for instance, a heavy glue suitable for use in box-making machinery, I prefer to start with a dextrine which contains an admixture of borax as stated above; but it will be understood that my invention is equally applicable to dextrines to which no borax has been added, or even dextrines which have a slightly acid content. As will be pointed out hereafter, my improved process may in a measure dispense with borax to obtain the solubility required in certain instances.

As an instance of a form of my process which I have found to be useful, I may add to a suitable dextrine, an alkaline perborate; such, for instance, as a perborate of sodium to the extent of about one to two per cent of the dextrine by weight. I find that from one to two per cent is usually sufficient to produce the bleaching action required, but I do not wish to limit myself to this quantity, as an excess of the perborate of sodium may produce other useful results; such, for instance, as leaving in the product decomposition products which will replace the borax heretofore used in whole or in part. A convenient method of practising my process consists in mixing the dextrine and perborate of sodium in a substantially dry condition and thereafter adding a sufficient amount of water to form a sizing or adhesive of the consistency required. The water added may be either hot or cold. I have also found in practice that after my new product comprising a dry dextrine and a dry alkaline perborate has stood for a while, it quite often absorbs enough water for the bleaching reaction to take place. The action of the perborate commences almost immediately after the addition of water, to give up oxygen to the solution and cause an almost immediate and progressively greater change of color as time goes on. The resulting product is substantially colorless and has all of the adhesive properties of a dextrine glue or sizing made according to the processes of the prior art. Some of my experiments indicate that enhanced adhesive properties are secured, but aside from the change in color the action of the oxygen carrier produces in general no appreciable change in the physical characteristics of the product. The reaction may occur in acid, alkaline or neutral solutions, and either at room temperature or under the influence of heat. A slight amount of heat hastens the reaction somewhat, but I prefer to maintain the temperature within moderate limits in order to prevent foaming during the reaction.

My invention may also be practiced in connection with the wet process for the manufacture of dextrine, by adding the alkaline perborate to the solution in which the dextrine is formed or to the dextrine containing solution after the formation of the dextrine. While I preferably employ a perborate of an alkali element, such as perborate of sodium, potassium or ammonium, I may, if desired, employ a perborate of an alkaline earth element, such as a perborate of calcium, magnesium, etc., and I therefore in the claims employ the words "alkaline perborate" to include either the perborate of an alkali element or the perborate of an alkaline earth element.

A main feature of my invention is the step in the process of forming a substantially colorless liquid adhesive, which comprises adding to dextrine, either in a wet or dry state, a constituent such as a perborate, which comprises a chemically combined dextrine solution accelerator, such as borax, and a bleaching element such as oxygen. When water, either acid, neutral or alkaline, is added to this mixture, it decomposes the perborate to give off oxygen therefrom whereby the freed oxygen may bleach the solution and the decomposed residuary dextrine solution accelerator, which is a boron compound, probably borax, may accelerate the solution of the dextrine. It is well known that boron compounds function as dextrine solution accelerators and also seem to increase the adhesiveness of the final product.

Any suitable types of dextrines may be used and any type of alkaline perborate, such as mentioned above, may be employed.

Since the processes described above are given merely by way of example, I do not intend to be confined thereto.

What I claim is:

1. The process of forming a substantially colorless liquid adhesive, which comprises, adding to dry dextrine a dry perborate of soda and adding water thereto to decompose the perborate, whereby the oxygen freed from said perborate may bleach the solution and the decomposed residuary boron compound may accelerate the solution of the dextrine.

2. The step in the process of forming a substantially colorless liquid adhesive, which comprises, adding to dextrine a perborate of sodium.

3. A composition of matter for use in forming a substantially colorless liquid adhesive containing dry dextrine and a dry perborate of sodium.

4. The process of forming a substantially colorless liquid adhesive, which comprises, adding to dry dextrine a dry alkaline perborate and adding water thereto to decompose the perborate, whereby the oxygen freed from said perborate may bleach the solution and the decomposed residuary boron compound may accelerate the solution of the dextrine.

5. The step in the process of forming a substantially colorless liquid adhesive, which comprises, adding to dextrine an alkaline perborate.

6. A composition of matter for use in forming a substantially colorless liquid adhesive containing dry dextrine and a dry alkaline perborate.

In testimony whereof, I have signed my name to this specification this 14th day of December, 1921.

LOUIS FACKLER.